July 27, 1971   M. G. ROSANSKY   3,595,700

METHOD OF MAKING ELECTRODE

Filed March 30, 1967

INVENTOR,
MARTIN G. ROSANSKY

United States Patent Office 3,595,700
Patented July 27, 1971

3,595,700
METHOD OF MAKING ELECTRODE
Martin G. Rosansky, Forest Hills, N.Y., assignor to
Leesona Corporation, Warwick, R.I.
Filed Mar. 30, 1967, Ser. No. 627,215
Int. Cl. H01m 13/00; B29c 15/00
U.S. Cl. 136—120     10 Claims

ABSTRACT OF THE DISCLOSURE

An improved method of assembling a lightweight electrode for disposition in an electrochemical cell and the resultant electrode is described. The method comprises applying a coating of catalyst to a continuous plastic membrane and pressing the coated film onto a metal grid by means of a pressure plate in contact with and bearing on the metal grid while the uncoated surface of the film is positioned on a resilient mat. As a result, the film and catalyst are firmly anchored to the grid with controlled distortion of the film.

FIELD OF INVENTION AND PRIOR ART

This invention relates to an improved method for making electrodes for use in electrochemical cells, to the resultant electrodes, and to electrochemical cells employing the electrodes. More particularly, the invention relates to the method of making lightweight electrodes comprising a continuous unsintered hydrophobic polymer film in contact with an electrocatalyst, the film and catalyst being pressed onto a metal grid.

The advantages of a lightweight electrode for use in electrochemical cells such as fuel cells and metal/air batteries have been recognized. Such electrodes normally comprise a porous support coated with a catalytic material such as a dispersion of metal black and hydrophobic polymer or a continuous hydrophobic film in contact with an electrocatalyst. The electrodes are extremely thin having low internal electrical resistance and, furthermore, take up only a very small space permitting the construction of highly compact cells having a high energy to volume and energy to weight ratio. The prior teachings have indicated the need to, or have processed the structures to obtain electrodes where the hydrophobic polymer film is sintered to the catalyst and/or to the metal support. More recently, however, as described in commonly assigned Fishman co-pending application Ser. No. 617,244, filed Feb. 20, 1967, it was discovered that superior electrodes can be obtained when the continuous film remains unsintered. However, in constructing such electrodes, problems are encountered in laminating the unsintered film to a metal grid when employing the grid as a current collector unless sintering temperatures are utilized.

OBJECTS OF THE INVENTION AND GENERAL DESCRIPTION

Accordingly, it is an object of the present invention to provide an improved method for making an electrode comprising a continuous unsintered hydrophobic polymer membrane in contact with a catalyst layer and metal grid, and the resultant electrode.

It is another object of the present invention to provide an improved method for making an electrode comprising a continuous unsintered hydrophobic polymer film in contact with a catalyst layer and metal grid wherein the surface of the metal grid is on the same plane as, or extends beyond the catalyst layer of the electrode.

It is still another object of the present invention to provide an improved method for making an electrode comprising a continuous unsintered hydrophobic polymer film in contact with a catalyst layer and metal grid wherein the metal grid is anchored or laminated to the coated continuous film without utilization of sintering temperatures.

It is still another object of the present invention to provide an improved method for making an electrode comprising a continuous unsintered hydrophobic polymer film in contact with a catalyst layer and metal grid wherein the metal grid is anchored or laminated to the coated continuous film with controlled stretching of the continuous film.

It is another object of the present invention to provide an improved lightweight electrode for an electrochemical cell which has high electrochemical activity and high structural integrity.

It is another object of the present invention to provide an improved lightweight electrode for an electrochemical cell which has high electrochemical activity and high structural integrity comprising a continuous polymer film in contact with a catalyst layer and metal grid wherein the surface of the metal grid is on the same plane as, or extends beyond the catalyst layer of the electrode.

These and other objects of the invention will be more readily apparent from the following detailed description with particular emphasis being placed on the preferred embodiment with specific reference to the drawing.

The objects of the present invention are accomplished by fabricating a lightweight electrode comprising an unsintered hydrophobic film, an electrocatalyst and a metal grid. The method comprises applying a catalyst species to the continuous film and pressing the coated continuous film onto a metal grid. During the pressing step, the surface of the continuous film which is uncoated is positioned on a resilient mat and the metal grid is in contact with a metal pressure-bearing plate. Pressures of from about 1 to 2,000 p.s.i. are applied to the plate, depending upon the thickness of the film and catalytic layer. The applied pressure embeds and anchors the grid to the continuous film. Since the film is positioned on the resilient mat, only controlled stretching of the film occurs, maintaining its integrity. The method permits the fabrication of electrodes having a high degree of integrity and uniform quality.

The unsintered hydrophobic polymer film utilized must be air permeable, but substantially liquid impermeable. Exemplary films are polymeric materials of linear fluorocarbons including polytetrafluoroethylene, polymonochlorotrifluoroethylene, polyvinylfluoride, polyvinylidenefluoride, and copolymers thereof. However, because of its exceptional hydrophobicity as well as its resistance to heat and the corrosive environment of the electrolyte, unsintered polytetrafluoroethylene is preferred. The optimum thickness of the hydrophobic films is from about 4 to 10 mils from the standpoint of air permeability and structural integrity. However, the thickness depends primarily upon the ultimate application of the electrode and can range from about 0.5 mil to 20 mils.

The electrocatalyst which is applied to the unsintered continuous film can be any of various metals, oxides or metal alloys which favorably influence an electrochemical reaction. Such electrocatalysts include columbium, nickel, iron, gold, copper, palladium, platinum, rhodium, ruthenium, osmium, erbium, silver, amalgams of silver and mercury, amalgams of gold and mercury, alloys thereof, and oxides. The particular application of the electrochemical cell will determine to a large extent the catalyst to be selected. For example, the Group VIII metals of the Mendelyeev's Periodic Table are preferred in view of their excellent properties insofar as withstanding the corrosive environment of an electrochemical cell and their high electrochemical reactivity. On the other hand, because of the economic factor, the more base metals such as silver, nickel, copper, and the like, or the aforesaid elements amalgamated with mercury, are preferred.

Moreover, it is possible and preferable to have hydrophobic polymer particles uniformly dispersed with the electrocatalyst. The hydrophobic polymer particles perform the dual purpose of binder and means for controlling the reaction interface of the electrode. Exemplary polymers for this purpose are the linear fluorocarbon polymers such as polytetrafluoroethylene, polytrifluoromonochloroethylene, polytrifluoroethylene, co-polymers thereof, and the silicone rubbers. Again, however, because of its resistance to temperature change and the environment of an electrochemical cell, polytetrafluoroethylene is preferred.

The catalyst layer can be applied to the unsintered continuous film employing various techniques. More specifically, a wetted mass of an electrocatalyst in the form of finely divided particles or black can be rolled onto the continuous film. In a preferred embodiment, the electrocatalyst is uniformly dispersed with the hydrophobic polymer binder. The binder functions not only to hold the structure intact, but, as noted hereinbefore, helps to control the reaction interface of the electrode. After the hydrophobic polymer-electrocatalyst admixture is rolled onto the film, the entire structure is preferably heat treated to bond the colloidal polymer particles to each other and to the continuous polytetrafluoroethylene (PTFE) film. Since the continuous film is unsintered, excellent bonding of the hydrophobic polymer particles is obtained at low temperatures and slight pressures. Although it is not essential to employ heat treatment in fabricating the electrodes, the heating step is preferred to obtain good adhesion of the catalyst to the film, etc. In the event heating is employed, the temperature must not exceed the sintering temperature of the film. In the case of PTFE, the sintering temperature is 327° C.

As an alternate to the rolling technique as described above, the catalyst and mixture can be applied to the hydrophobic polymer film by spraying a catalyst dispersed in a suitable medium such as water, organic solvents, or the like, onto the film, or by applying the catalyst to the film with a doctor blade. Regardless of the method utilized for applying the catalyst layer to the continuous film, it is usually desirable, although not essential, to apply light pressure to press the catalyst mixture into intimate contact with he continuous film, followed by heating below the sintering temperture of the film.

The metal grid which is employed in the construction of the presently described electrode must be porous, electrically conductive and able to withstand the corrosive environment of an electrochemical cell. Suitable metal supports which are preferably from 1 to 20 mils thick and having a porosity of from about 35 to 90 percent are composed of nickel, copper, iron, titanium, tantalum, gold, silver alloys and mixtures thereof. Primarily from the standpoint of their exceptional resistance to the corrosive environment of the cell and their relative inexpensiveness, nickel, titanium, or tantalum supports are preferred. Moreover, expanded metal meshes which have been rolled flat are particularly desirable.

Electrodes prepared according to the present invention can be employed in various electrochemical cells, such as fuel cells, as either the anode or cathode, oriented in order that the continuous film is in contact with the reactant gas and the catalyst in contact with the electrolye of the cell. Because of the liquid impermeability of the film, the electrodes can be used with a free-flowing electrolyte or with an electrolyte trapped in a suitable matrix. In addition to their application in fuel cells, the electrodes have exceptional utility as the cathode in metal/air cells. In such application, the unsintered continuous film is in contact with ambient air or an oxygen supply and the catalytic layer is in contact with the electrolyte of the cell. Various electrolytes such as the alkali hydroxides and acid electrolytes such as sulfuric and phosphoric acid have been found to be particularly suitable.

DRAWING AND DETAILED EXAMPLE WITH REFERENCE TO THE DRAWING

Having described the invention in general terms, reference is made to the accompanying drawing wherein FIG. 1 is a perspective, exploded view of the elements of the electrode;

Figure 1:
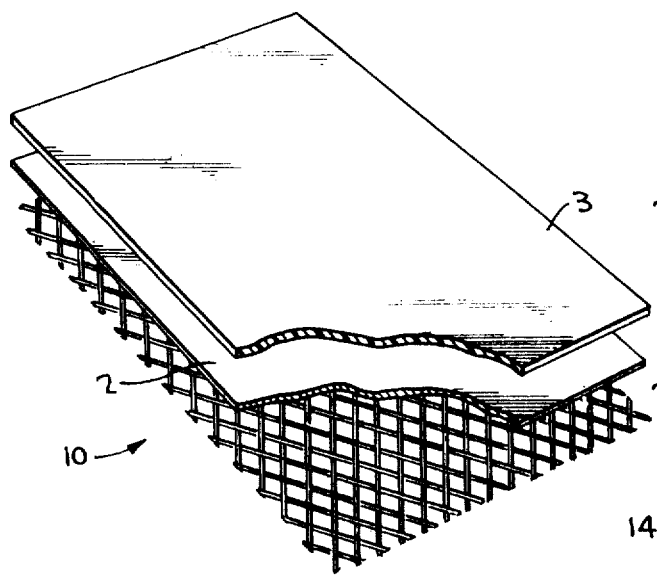
Figure 2:
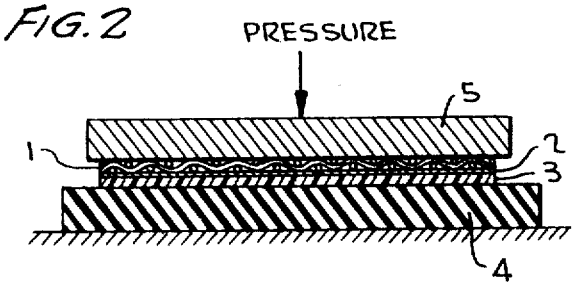
FIG. 2 is a cross-sectional view of the electrode elements positioned in the device for constructing the electrode.
Figure 3:
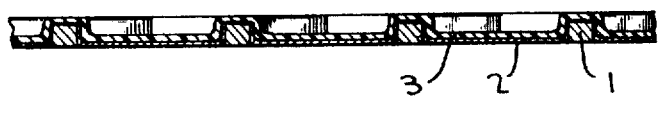
FIG. 3 is an enlarged cross-sectional view illustrating the anchoring of the film and catalyst to the metal grid.

More specifically, referring to the drawing, particularly FIGS. 1 and 3, electrode 10 comprises a metal grid 1, a catalyst layer which may or may not be self-supporting 2, and a continuous unsintered hydrophobic film 3. In the embodiment shown, the metal grid is a nickel screen having 10½ to 11 meshes per inch which after being rolled flat is 0.009 to 0.010 inch thick. The grid is degreased and deburred by sandblasting. The continuous film is unsintered PTFE free of dyes, greases, cleaning oils, or other foreign materials having a thickness of 0.007 to 0.008 inch, a specific gravity of 1.57 to 1.60, and uniform density and strength throughout. The catalyst layer comprises a dispersion of PTFE particles and platinum black in an aqueous medium at a weight ratio of 10 parts platinum black and three parts PTFE.

In fabricating the electrode, the unsintered PTFE film is cleaned with distilled water and placed on a glass plate. The catalyst paste, approximately one gram per 150 square centimeters of film, is applied to the center of the film and spread with a spatula. Thereafter, the catalyst is rolled onto the unsintered membrane using a glass rod as a roller. Rolling is continued with light pressure until the unsintered PTFE membrane is completely and evenly covered. The nickel grid is laid on top of the catalyst covered film. A piece of white Verifax copy paper is placed over the cathode grid. The surface of the paper is wetted with water and the grid pressed into the catalyst layer with a gentle rolling action utilizing a glass rod. The cathode structure is turned over and the uncoated surface of the film wiped clean. The cathode structure with the uncoated surface of the membrane down is placed on a foam-rubber pad 4 one-fourth inch thick. A metal pressure plate 5 is inserted on top of the cathode over the metal grid and the complete assembly placed under a ram for pressing. The assembly is pressed using a pressure of 800 plus or minus 50 pounds per square inch of cathode surface. After the pressing, the structure is pre-heated to a temperature of 130° C. for three-quarters of an hour in a ventilated air circulating oven. Thereafter, the temperature is raised to 300° C. and the cathode heat treated for a period of 1¼ hours. It is essential that the temperature does not rise over 327° C. in the case of polytetrafluoroethylene film. In the event a membrane composed of a different polymer is utilized, the temperature must not exceed the sintering temperature of the material. The final structure has an appearance as shown in FIG. 3. More specifically, the PTFE film which has undergone controlled stretching is firmly anchored to the grid.

Figure 4:
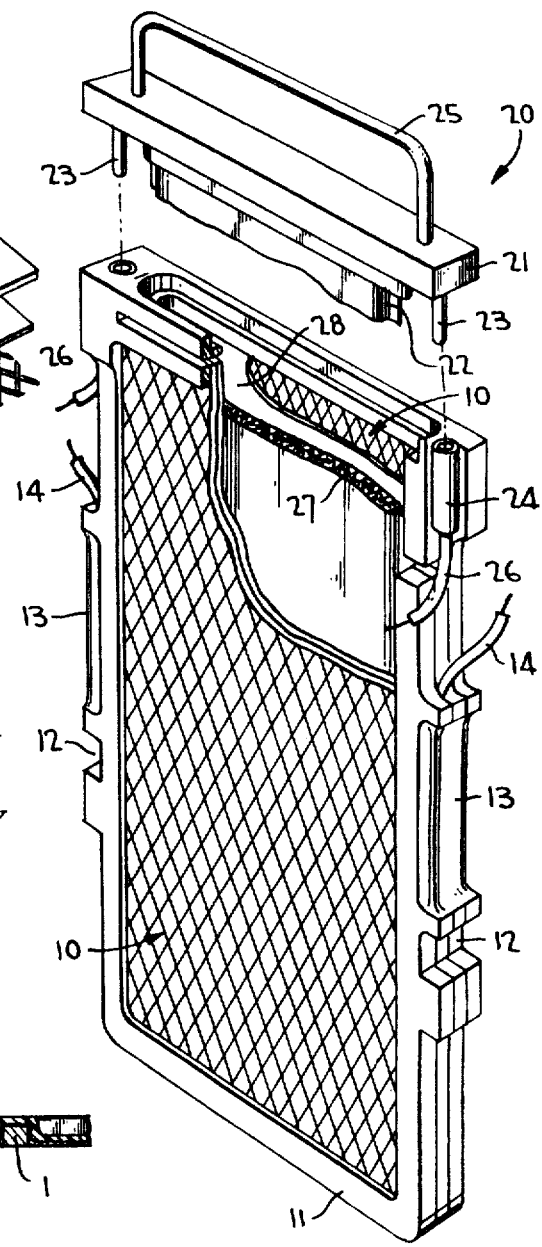
FIG. 4 is an illustration of a metal/air bi-cell partially in section.

The cathode structure manufactured as described above is then cut to size and mounted in a bi-cathode assembly of the type shown in FIG. 4. The assembly comprises a bi-cell frame 11 and reactive cathodes 10. The frame contains cell guide supports 12 which facilitate the positioning of the cell module in a battery casing and mouldings 13 which house positive leads 14 which are in electrical contact with the cathode. An anode 20 comprising a top portion 21 and a metal body 22 is inserted into the envelope catalyst and is locked into position by negative terminals 23 which fit into negative terminal jacks 24.

The terminals are in electrical contact with the anode body through the anode top. Handle 25 is employed to facilitate removal of the anode. Negative leads 26 emerge from the jack terminal at each side of the cell. In the embodiment shown, the anode comprises a porous zinc body pressed around a conductive screen 27. Anode separator paper 28 completely surrounds the anode and serves as a matrix for retaining the cell electrolyte which preferably is a solution of aqueous 31 percent potassium hydroxide. A plurality of the aforesaid bi-cells when in series or parallel connection can be utilized as the power source for various units including radio receiving and transmitting sets.

In the aforesaid embodiment, the unsintered film can be replaced with other fluorocarbon polymers including polymonochlorotrifluoroethylene, polyvinylfluoride, polyvinylidenefluoride, and co-polymers thereof. Additionally, the catalyst can be utilized without a polymer binder and can comprise electrocatalysts of metals, oxides, or alloys of nickel, copper, gold, silver, amalgams of silver and mercury, amalgams of gold and mercury, cobalt, admixtures of cobalt and nickel, palladium, iridium, and osmium. As is further apparent, the aforesaid method of fabricating lightweight electrodes can be utilized employing hydrophilic films such as membranes of polymethylmethacrylate, polyvinylalcohol, regenerated cellulose, copolymers of polyvinylchloride and polyvinylalcohol, and the like. Electrodes having a hydrophilic membrane can be advantageously employed in electrochemical cells maintaining the membrane in contact with the electrolyte of the cell and the catalyst in contact with the reactant feed. It should be appreciated that the instant invention is not to be construed as being limited by the aforesaid illustrative embodiment. It is possible to produce still other embodiments without departing from the inventive concept herein disclosed. Such embodiments are within the ability of one skilled in the art.

It is claimed:

1. An improved method of constructing a lightweight electrode for use in an electrochemical cell comprising (1) placing a membrane-grid composite comprising a continuous membrane consisting essentially of a polymer having a coating of an electrocatalyst only on one surface and a foraminous metal grid on said coated surface on a pressure deformable surface with the uncoated surface of said membrane being in contact with said pressure deformable surface; and (2) applying sufficient pressure to said grid to press said membrane and electrocatalyst coating into the foramina of said grid to anchor said grid to the continuous membrane while retaining one surface of the grid substantially uncoated by catalyst and producing an electrode in which the metal grid and electrocatalyst coating are substantially co-extensive.

2. The method of claim 1 wherein the continuous polymer membrane is hydrophobic.

3. The method of claim 2 wherein the membrane is polytetrafluoroethylene.

4. The method of claim 3 wherein the catalyst layer comprises an admixture of metal catalyst and polytetrafluoroethylene.

5. The method of claim 2 wherein the polymer membrane is an unsintered hydrophobic membrane.

6. The method of claim 5 wherein the hydrophobic membrane is polytetrafluoroethylene.

7. The method of claim 6 wherein the metal grid is an expanded metal mesh.

8. The method of claim 6 wherein the electrocatalyst comprises an admixture of metal catalyst, and polytetrafluoroethylene binder.

9. The method of claim 1 wherein the pressure is applied at room temperature.

10. The method of claim 1 wherein the pressure is applied at an elevated temperature.

References Cited

UNITED STATES PATENTS

| | | | |
|---|---|---|---|
| 272,033 | 2/1883 | Edge | 264—273X |
| 2,003,494 | 6/1935 | Reynolds | 264—273X |
| 2,218,351 | 10/1940 | Crowell | 264—273X |
| 3,297,484 | 1/1967 | Niedrach | 136—86 |
| 3,438,815 | 4/1969 | Giner | 136—86 |
| 3,167,457 | 1/1965 | Bacon et al. | 136—120FC |
| 3,378,406 | 4/1968 | Rosansky | 136—86 |
| 3,382,103 | 5/1968 | Smith | 136—120X |
| 3,385,736 | 5/1968 | Deibert | 136—120 |

ALLEN B. CURTIS, Primary Examiner

U.S. Cl. X.R.

136—86; 264—249, 273